United States Patent
Topmiller

(10) Patent No.: US 6,434,516 B1
(45) Date of Patent: Aug. 13, 2002

(54) METHOD AND APPARATUS FOR SYNTHESIZING AN INCREMENTAL SIGNAL

(75) Inventor: David Allen Topmiller, Fort Wright, KY (US)

(73) Assignee: Balluff, Inc., Florence, KY (US)

( * ) Notice: Subject to any disclaimer, the term of this patent is extended or adjusted under 35 U.S.C. 154(b) by 0 days.

(21) Appl. No.: 09/439,064

(22) Filed: Nov. 12, 1999

(51) Int. Cl.[7] ............................................. G01B 7/008
(52) U.S. Cl. ..................................... 702/198; 324/208
(58) Field of Search ............................ 702/198, 33, 46, 702/57, 64, 66, 75, 78, 79, 85, 86, 89, 94, 104–106, 107, 113, 116, 117, 124–126, 150, 151, 152, 183, 184, 189; 324/600, 605, 606, 607, 609, 674, 681, 683, 684, 76.11, 76.39, 76.47, 76.22–5; 326/100; 327/1, 2, 3, 8, 22, 23, 31, 35, 39, 40, 47, 48, 101, 102, 105, 116, 164, 167, 178, 520; 377/2, 3; 700/302

(56) References Cited

U.S. PATENT DOCUMENTS

| | | | |
|---|---|---|---|
| 3,553,447 A | 1/1971 | Zimmerman et al. ........ 708/846 |
| 3,898,555 A | 8/1975 | Tellerman .............. 324/207.13 |
| 4,071,818 A | 1/1978 | Krisst ......................... 324/208 |
| 4,121,155 A | 10/1978 | Chamuel ............... 324/207.13 |
| 4,144,519 A | 3/1979 | Chamuel ..................... 324/208 |
| 4,238,844 A | 12/1980 | Ueda et al. .................. 367/117 |
| 4,281,662 A * | 8/1981 | Brent ......................... 600/400 |
| 4,319,189 A | 3/1982 | Cullum et al. .............. 324/208 |
| 4,396,976 A * | 8/1983 | Hyatt ............................. 700/1 |
| 4,433,291 A | 2/1984 | Yariv et al. .................. 324/244 |
| 4,453,825 A * | 6/1984 | Buck et al. ................. 342/127 |
| 4,522,517 A * | 6/1985 | Wade et al. ........... 340/870.37 |
| 4,573,139 A | 2/1986 | Bonivich ...................... 700/56 |
| 4,654,590 A | 3/1987 | Kitaura et al. .............. 324/208 |
| 4,658,373 A | 4/1987 | Murakami et al. .......... 700/213 |
| 4,678,993 A | 7/1987 | Vinnemann et al. ........ 324/208 |
| 4,683,456 A * | 7/1987 | Nelson ........................ 341/166 |
| 4,697,125 A | 9/1987 | Goff et al. ................... 318/254 |
| 4,721,902 A | 1/1988 | Tellerman et al. ............. 73/610 |
| 4,724,525 A | 2/1988 | Purcell et al. ............... 702/168 |
| 4,726,226 A | 2/1988 | Tellerman ..................... 73/292 |
| 4,739,186 A | 4/1988 | Crookshanks ............... 307/106 |
| 4,787,058 A | 11/1988 | Schmars ...................... 708/801 |
| 4,796,005 A * | 1/1989 | Ishida et al. ................. 318/603 |
| 4,803,427 A | 2/1989 | Mason et al. ........... 324/207.13 |

(List continued on next page.)

OTHER PUBLICATIONS

Creonics Manual—*TEC–242 Transducer to Encloder Converter Installation and Setup Manual*, Mar. 3, 1989, Stock No. 999–059.

*Primary Examiner*—Marc S. Hoff
*Assistant Examiner*—Edward Raymond
(74) *Attorney, Agent, or Firm*—Dinsmore & Shohl LLP

(57) ABSTRACT

An incremental signal emulation method and apparatus which utilizes a variable frequency signal which is based on the rate of change of a sensor measurement. Preferably, the variable frequency signal is made up of a number of pulses, the frequency of which is based upon the rate of change of the sensor measurement. The variable frequency signal is converted to A and B incremental signals, the phase relationship between the A and B signals representing the sign (positive or negative) of the rate of change, and each transition in the A or B signal representing an increment to be added to or subtracted from the synthesized sensor measurement count. In one embodiment, a voltage-to-frequency converter is used to convert a velocity signal to a variable frequency signal, and flip flops and inverters are used to create the A and B signals. Preferably the A and B signals are square waves in quadrature. A method and apparatus for accurately controlling the output of an incremental signal generation system is also provided, wherein the synthesized transducer measurement count is fed back to produce a measurement error signal. The error signal is then used to drive an incremental signal generation circuit in order to produce A and B incremental signals.

27 Claims, 9 Drawing Sheets

U.S. PATENT DOCUMENTS

| | | | | |
|---|---|---|---|---|
| 4,831,510 A | | 5/1989 | Dummermuth et al. ........ 700/56 |
| 4,936,143 A | | 6/1990 | Schutten et al. ............... 73/597 |
| 4,943,760 A | * | 7/1990 | Byrne et al. ................. 318/701 |
| 4,990,058 A | | 2/1991 | Eslinger ....................... 417/46 |
| 4,995,019 A | | 2/1991 | Begin .......................... 368/117 |
| 5,038,305 A | | 8/1991 | Kumar et al. ................. 702/94 |
| 5,050,135 A | | 9/1991 | Pai et al. ..................... 367/127 |
| 5,115,195 A | | 5/1992 | Peterson et al. ........ 324/207.13 |
| 5,150,049 A | | 9/1992 | Schuetz ................. 324/207.12 |
| 5,206,586 A | | 4/1993 | Yauch et al. ........... 324/207.13 |
| 5,287,285 A | | 2/1994 | Tsai et al. ................... 700/195 |
| 5,311,124 A | | 5/1994 | Hubbard ................ 324/207.13 |
| 5,334,933 A | | 8/1994 | Tellerman .............. 324/207.14 |
| 5,403,238 A | | 4/1995 | Baxter .......................... 472/43 |
| 5,412,317 A | | 5/1995 | Kyoizumi .............. 324/207.14 |
| 5,416,397 A | | 5/1995 | Mazzara et al. ............. 318/696 |
| 5,456,114 A | | 10/1995 | Liu et al. ....................... 73/597 |
| 5,473,990 A | | 12/1995 | Anderson et al. .............. 104/85 |
| 5,508,975 A | | 4/1996 | Walter ............................ 95/30 |
| 5,583,844 A | | 12/1996 | Wolf et al. ..................... 701/1 |
| 5,623,878 A | | 4/1997 | Baxter et al. .................. 104/85 |
| 5,717,330 A | | 2/1998 | Moreau et al. ......... 324/207.13 |
| 5,764,165 A | * | 6/1998 | Buch .......................... 341/152 |
| 5,796,250 A | | 8/1998 | Dames .................. 324/207.14 |
| 5,831,432 A | | 11/1998 | Mohri ........................ 324/245 |
| 6,097,183 A | | 8/2000 | Goetz et al. ........... 324/207.14 |
| 6,192,753 B1 | | 2/2001 | Czarnek ....................... 73/313 |
| 6,192,754 B1 | | 2/2001 | Czarnek ....................... 73/313 |
| 6,249,234 B1 | | 6/2001 | Ely et al. ...................... 341/20 |

\* cited by examiner

METHOD AND APPARATUS FOR SYNTHESIZING AN INCREMENTAL SIGNAL

TECHNICAL FIELD

The present invention relates generally to methods and apparatus for converting an absolute measurement signal to an incremental signal. In particular, one embodiment of the invention relates to a method and apparatus for converting a sensor measurement to an "A quad B" incremental encoder signal through the use of a voltage-to-frequency convertor circuit, such that the frequency of the "A quad B" signal varies in accordance with the rate of change of the measurement. Moreover, in this embodiment, a feedback loop is utilized to ensure accurate representation of the sensor measurement by the incremental encoder signal.

BACKGROUND OF THE INVENTION

Sensors can provide output signals in a variety of formats. For example, a linear position transducer can provide a pulsed signal comprising a pair of pulses which represent the measured position by the time between the pulses. Such a transducer can also provide an analog voltage signal having an amplitude which represents the measured position, or a digital signal having a binary value which represents the measured position. These signals are all considered "absolute" measurement signals because they have one characteristic which represents the absolute value of the measured variable at all times. Accordingly, with an absolute measurement signal, the value of the measured variable can be determined by simply examining the measurement signal at any instance in time; previous characteristics of the signal are not relevant.

However, many industrial controllers and motion control devices require the measured variable to be represented in an "incremental" format, rather than in an absolute format. An optical encoder is an example of a device which indicates a change in a variable through the use of an incremental signal, such as a series of pulses, each pulse indicating an incremental change in the variable. The controller which receives this incremental output counts the pulse transitions to determine the variable measured by the encoder. Thus, the controller cannot evaluate an incremental signal at any instance in time to determine the value of the variable; the previous pulses in the incremental signal are relevant to determining the relevant to determining the value of the variable.

One typical incremental signal provided by an encoder is referred to as an "A quad B" signal, in which two trains of pulses (A and B) are provided which are 90 degrees out of phase from one another ("in quadrature"). As shown in FIGS. 1a and 1b, signal A is typically a square wave alternating between the logical level 0 and the logical level 1, while signal B mimics A but either lags or leads A by 90 degrees, depending upon the direction of movement of the variable being measured. For example, the phase relationship of B leading A, shown in FIG. 1a, could represent an increase in the measured variable, and the phase relationship of A leading B, shown in FIG. 1b, could represent a decrease in the measured variable. Each transition of the A or B square wave from high to low or low to high represents one incremental movement in the measured variable. The A and B output signals are delivered to a signal processing circuit, which may include a bidirectional counter and/or associated software to keep a running count of the output pulses. The count is increased when the measured variable moves in the positive direction, as indicated by the phase relationship of the A and B signals, and the count is decreased when the measured variable moves in a negative direction. After determining the count (which represents the measured variable), the controller can then regulate the machine or process, as known in the art.

Because many controllers require an incremental input to accurately control the machine or process, it is desirable to convert an output signal from an absolute format, such as a digital, analog, or pulsed signal, to an incremental format, such as an "A quad B" square wave format. Making such a conversion allows a controller requiring incremental signals for input to be used with a sensor having an absolute measurement output.

U.S. Pat. No. 5,206,586 discloses a linear position magnetostrictive transducer which allegedly generates an emulated square-wave-in-quadrature encoder output, providing quadrature pulses indicating the location of a position magnet along the length of a magnetostrictive gauge. The patent discloses a microprocessor-based conversion system in which a raw count, which is proportional to the physical location of the position magnet, is converted into quadrature pulses, the number and frequency of which purportedly vary with magnet position and velocity. However, such a microprocessor-based system is limited by the microprocessor clock frequency. Accordingly, if the microprocessor clock frequency is slower than the speed at which the magnet is moved, velocity will not be accurately represented by the synthesized encoder signal. In particular, the position represented by the encoder signal will significantly lag the actual position of the magnet during this high velocity movement.

Thus, there remains a need for an improved method and apparatus to convert an absolute sensor output signal to an incremental signal, such as an "A quad B" encoder signal for example, which can represent both position and velocity in a highly accurate manner and with high resolution. In addition, there remains a need for a method and apparatus to convert an absolute sensor output signal to an incremental signal which is not limited by a fixed clock for conducting the conversion.

SUMMARY OF THE INVENTION

One object of the present invention is to obviate the above-described problems.

It is another object of the present invention to provide a method and apparatus for converting an absolute measurement signal to an incremental signal with high accuracy and high resolution.

A further object of the invention is to provide a method and apparatus for synthesizing an incremental signal that is not limited by a fixed-clock frequency and/or by a microprocessor.

Yet another object of the invention is to convert an absolute signal representing a measured variable to a series of pulses with minimal lag time between the absolute signal and the pulse count.

Another object of the present invention is to provide a method and apparatus to convert an output signal to an incremental signal while automatically correcting for discrepancies between the two signals.

Another object of the invention is to provide an absolute signal to incremental signal conversion method and apparatus which can automatically compensate for errors which occur during operation due to component limitations.

One object of the present invention is to provide a synthesized incremental output signal generator which is driven by a variable frequency signal.

It is another object of the present invention to provide a method and apparatus for converting a linear position transducer output signal to an incremental encoder signal with high accuracy and resolution in velocity and position.

To achieve the foregoing and other objectives, a method of producing an incremental signal from an absolute measurement signal is provided. The method comprises receiving a rate of change of an absolute measurement signal, and generating a variable frequency signal based upon the rate of change. The frequency of the variable frequency signal is proportional to the rate of change. The method also comprises providing a first incremental signal comprising a series of pulses. The frequency of the pulses is based upon the frequency of the variable frequency signal.

According to another aspect of the invention, a system for using an absolute measurement signal to generate an incremental signal is provided. The system comprises a sensor configured to provide an absolute measurement signal, and a calculation circuit in communication with the sensor and configured to determine the rate of change of the absolute measurement signal. The system also comprises a variable frequency generation circuit and an incremental signal generator circuit in communication with the variable frequency generator circuit. The variable frequency generator circuit is configured to provide a variable frequency signal whose frequency varies in proportion to the rate of change. The incremental signal generator circuit is configured to provide a first series of pulses whose frequency is proportional to the frequency of the variable frequency signal, and to provide a second series of pulses whose phase is shifted with respect to the first series of pulses.

A method for producing an incremental signal from an absolute measurement signal is also provided. The method comprises providing an absolute measurement signal, determining the difference between the absolute measurement signal and a synthesized measurement signal, and generating a first incremental signal and a second incremental signal based upon the difference. The first and second incremental signals are out of phase. The method also comprises decoding the incremental signals to generate the synthesized measurement signal.

Still other objects of the present invention will become apparent to those skilled in this art from the following description wherein there is shown and described preferred embodiments of this invention, including a best mode currently contemplated for carrying out the invention, simply for the purposes of illustration. As will be realized, the invention is capable of other different aspects and embodiments without departing from the scope of the invention. Accordingly, the objects, drawings, and descriptions are illustrative in nature and not restrictive in nature.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which:

DETAILED DESCRIPTION OF PREFERRED EMBODIMENTS

Figure 1A:
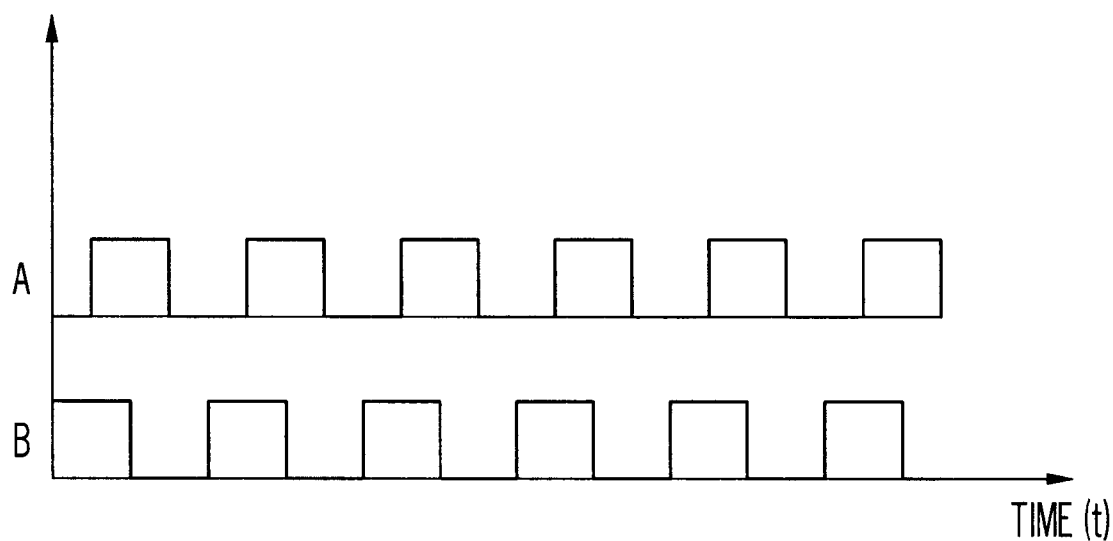
FIGS. 1a and 1b are timing diagrams of exemplary A quad B output signals, such as can be synthesized according to the present invention.
Figure 1B:
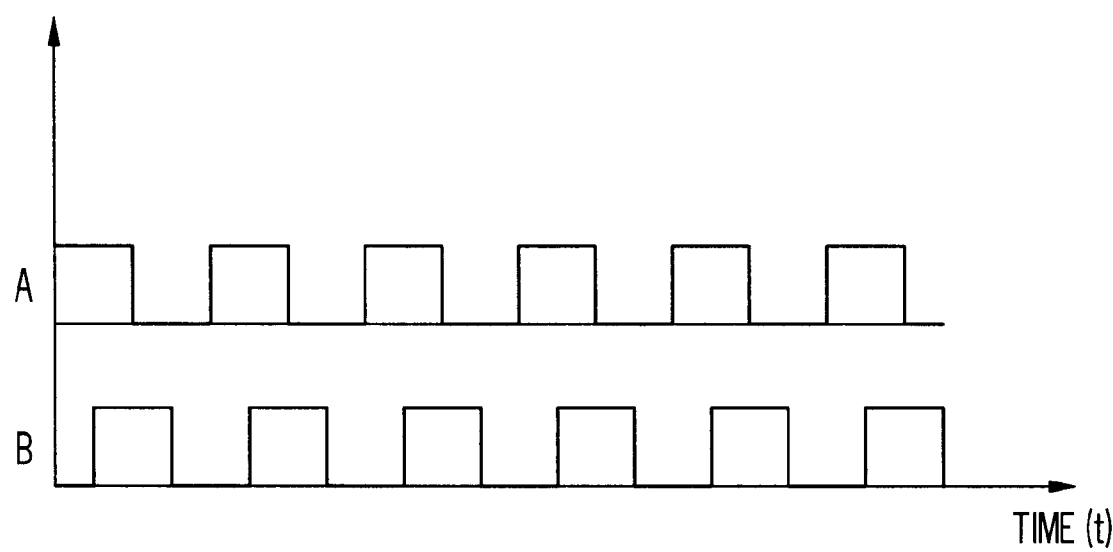
Figure 2:
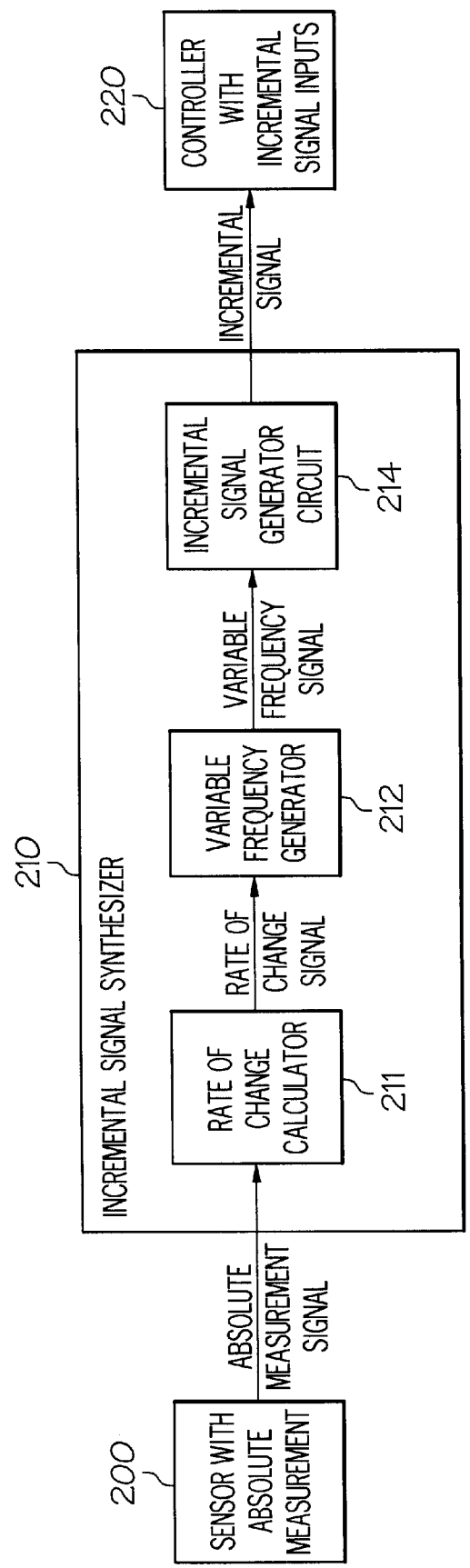
FIG. 2 is a block diagram illustrating an exemplary incremental signal synthesizer arrangement, made according to principles of the present invention.

Turning now to the drawings in detail, wherein like numbers illustrate corresponding structure, FIG. 2 illustrates an embodiment of a system having an incremental signal synthesizer, according to principles of the present invention. The system includes a sensor 200 which measures a variable and produces an absolute signal representing the measured variable. In other words, the absolute signal represents the measured variable in relation to a fixed reference point. In contrast, an incremental signal, such as the "A quad B" signal of FIGS. 1a and 1b for example, represents a measured variable by indicating that increments are to be added to or subtracted from a variable reference point. The sensor 200 could be any of a variety of sensors, such as a position transducer, a pressure transducer, or a temperature sensor, for example. Also, the measured parameters could be any of a variety of conditions or parameters measured by such sensors.

Also included in the exemplary system of FIG. 2 is an incremental signal synthesizer module 210 which receives the absolute measurement signal from the sensor 200 and converts it to an incremental signal. Preferably, the synthesizer 210 includes a rate of change calculation circuit 211 which determines the rate of change of the absolute measurement. For example, the rate of change could be determined by subtracting a previous measurement of the sensor 200 from a current measurement of the sensor, and dividing the difference by the time period between the two measurements.

In this embodiment, the rate of change signal is then provided to a variable frequency generator circuit 212 which uses the rate of change signal to produce a variable frequency signal. Then, the variable frequency signal can be converted to an appropriate incremental signal by an incremental signal generator circuit 214. Preferred methods and apparatus in exemplary applications for making the conversion from a rate of change signal to a variable frequency signal, and then from a variable frequency signal to an incremental signal are described below. One way to make such a conversion is to convert the absolute measurement signal from the sensor 200 to a rate of change voltage, which is then provided to a voltage-to-frequency convertor to produce the variable frequency signal. The variable frequency signal can then be "squared off" by appropriate circuitry, if desired, to produce a first incremental pulse signal. Moreover, if desired, the variable frequency signal can be phase shifted to produce a second incremental pulse signal which is out of phase from the first incremental pulse signal. Accordingly, the incremental signals can comprise "A quad B" signals, such as the ones shown in FIGS. 1a and 1b.

The incremental signal from the incremental signal synthesizer module 210 can then be provided to a controller 220 which requires an incremental signal input. As can be understood, changes in the absolute measurement signal are converted to the appropriate number of incremental signal transitions by the incremental signal synthesizer module 210. The controller 220 adds or subtracts these increments from a reference position in order to keep a running tally of the absolute measurement signal. As an example, the controller 220 could comprise a controller which requires an encoder signal as an input. Accordingly, the incremental signal synthesizer module 210 allows the absolute measurement sensor 200 to be used with an incremental-type controller 220, and also allows the sensor 200 to appear as an incremental encoder.

The incremental signal synthesizer 210 can be an integral part of the electronics of the sensor 200. Alternatively, the incremental signal synthesizer 210 could be provided as a separate unit which can be connected to any of a variety of sensors 200, as needed. It is also contemplated that the rate of change calculation circuit 211 can be provided within the sensor 200.

Figure 3:
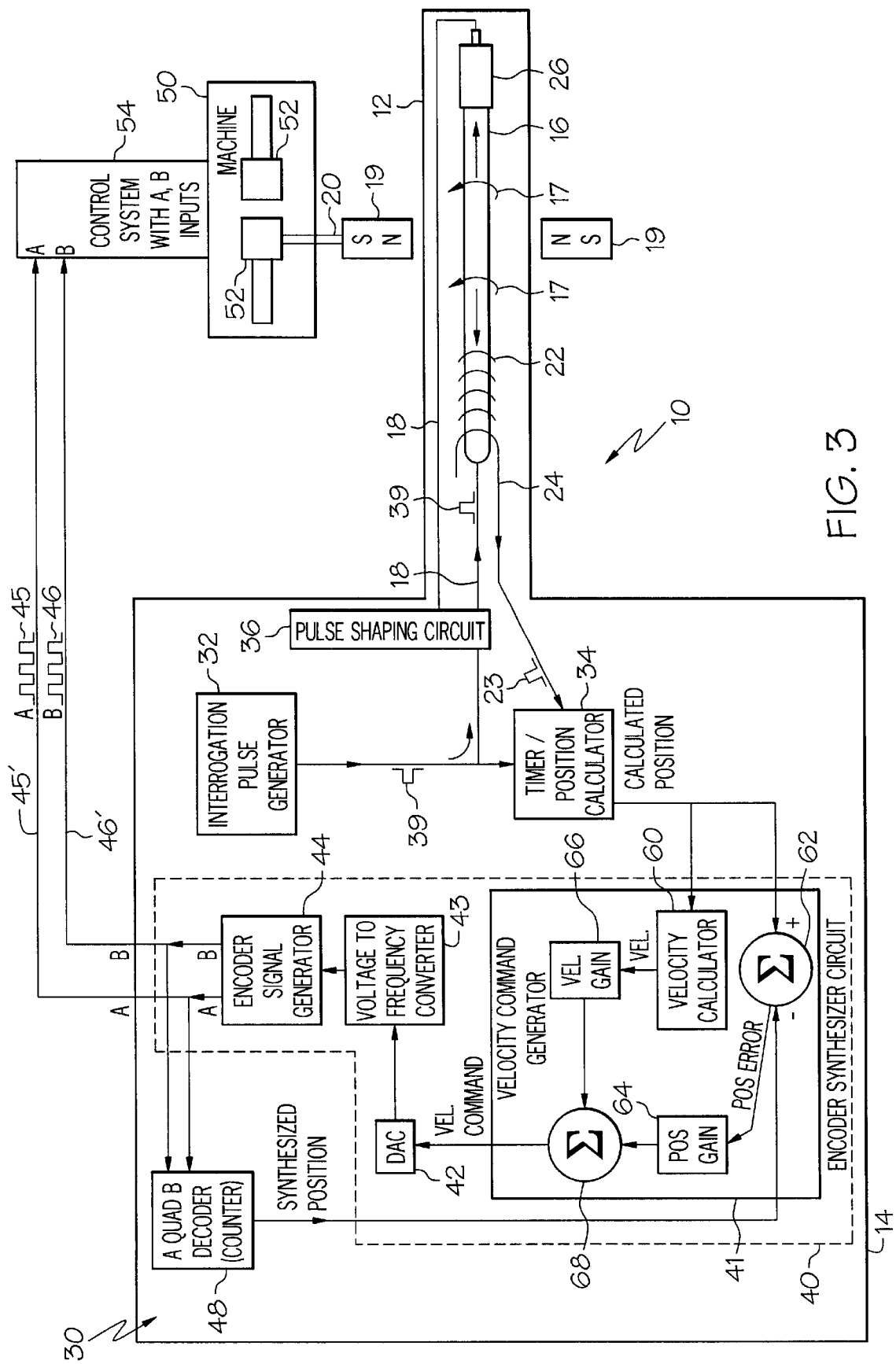
FIG. 3 is a block diagram illustrating an embodiment of a magnetostrictive position sensor having an internal encoder synthesizer circuit, made in accordance with principles of the present invention.

FIG. 3 illustrates an exemplary linear position transducer having a synthesized incremental output, in accordance with the principles of the present invention. The exemplary linear position transducer 10 includes a waveguide housing 12 and an electronics housing 14. While such linear position transducers can take any of a variety of forms and structural combinations known in the industry, exemplary structures will be discussed for purposes of general illustration and understanding of the present invention. Exemplary structures are disclosed in U.S. Pat. Nos. 5,903,426, and 5,923,164, the entire disclosures of which are hereby incorporated herein by reference.

The shape of the housing 12 in FIG. 3 can depend upon the application of the transducer 10. For example, a rod-style or cylindrical housing could be utilized for insertion into hydraulic cylinders, and a generally rectangular-shaped housing might be utilized for applications having moving components external to cylinders. The housings 12 and 14 are preferably made of an extruded aluminum or stainless steel, although other rigid, protective materials could be utilized.

Provided within the waveguide housing 12 is a magnetostrictive waveguide 16, which is preferably in the form of an elongated wire, rod, or bar, and most preferably is tubular in shape. The waveguide 16 is generally made from a magnetic material which has the ability to deform in proportion to the strength of an applied magnetic field, and is therefore considered "magnetostrictive." Examples of such materials include nickel and nickel-alloy. Preferably, the waveguide 16 is hollow and includes an opening which extends longitudinally through its center.

A conductor 18 runs from electronics 30 in the electronics housing 14, and through the length of the opening within the tubular waveguide 16. The conductor 18 then runs back to the electronics 30 on the exterior of the waveguide 16. Alternatively, the waveguide 16 could comprise a solid wire or rod of conductive material. In such a case, two conductors 18 could be provided to connect the two ends of the solid waveguide 16 to the appropriate electronics.

At one end of the waveguide 16 is a pickup coil 22 which has a portion which effectively surrounds an end portion of the waveguide. Other suitable signal convertors could be utilized as alternatives to the coil 22, such as a magnetic tape or a piezoelectric crystal for example.

Surrounding or connected to the opposite end of the waveguide 16 is a damper 26, which is preferably made of a silicone, rubber or other material which can absorb mechanical waves to minimize interference from wave reflections. The damper is preferred because it can prevent reflected waves from possibly interfering with future measurements.

Slidingly engaged with the exterior of the waveguide housing 12 is a magnet 19. The magnet 19 can have a round shape with a center opening (e.g., a donut-like shape) for engaging the housing 12. The magnet 19 could take on other shapes and configurations as well. For example, the magnet 19 could have a flat, rectangular shape to slidingly engage one side of the housing 12, such as through the engagement of a groove or track on the housing 12. As another alternative, the magnet 19 could comprise an existing movable part of a machine, such as a magnetic piston head within a cylinder of a machine, or could comprise a plurality of magnets spaced around the waveguide.

In the exemplary embodiment of FIG. 3, the magnet 19 is mechanically connected, via control arm 20, to a movable member 52 within a machine 50. For example, the movable member 52 could comprise a movable face on a hydraulic press, or a movable spindle on a spindle press. Because of the linkage 20 between the movable member 52 and the magnet 19, movement of the member 52 results in corresponding movement of the magnet 19. Other applications are contemplated as well, such as, for example, placing the housing 12 in a vertical position, and providing a float on the magnet 19 to allow it to follow the movement of a fluid in a container. A control system 54 is provided to receive "A quad B" output pulses 45 and 46 from the transducer 10, and to control operation of the machine 50 based, at least in part, on these pulses. Preferably, a rising or falling edge of one of the two signals 45 and 46 represents an incremental change in the position of the magnet 19. Thus, the frequency of the pulses 45 and 46 indicate the velocity of the magnet 19.

The electronics 30 within the electronics housing 14 control the operation of the transducer 10. The electronics 30 and housing 14 can be located in proximity to the waveguide housing 12, or in a remote location, as needed by the application. Also, a separate housing need not be provided for the electronics 30.

In operation, a pulse generator 32 provides an interrogation pulse signal 39 of electrical current to the electronics 30 and through the conductor 18. (Alternatively, the control system 54 can include a pulse generator to provide the interrogation pulse signal 39 through the conductor 18, in which case the pulse generator 32 would not be needed.)

This pulse 39 generates a circular electromagnetic field which rotates around the waveguide 16. When the electromagnetic field intersects with the magnetic field of the magnet 19, a magnetostrictive effect is created, causing deformation of the waveguide 16. The deformation travels or propagates along the waveguide 16 in both directions from the point of the magnet 19 in the form of a mechanical wave 17. The propagation velocity, or gradient, of the mechanical wave 17 along the waveguide 16 is usually about 2830 meters per second (m/s) for waveguide materials typically used in such transducers. Preferably, the pulse 39 is fed from the pulse generator 32 and through a pulse shaping circuit 36 prior to being fed through the conductor 18. The pulse shaping circuit 36 provides any necessary shaping of the pulse 39, such as amplification for example, to ensure that the pulse 39 is of the proper amplitude and duration to produce a detectable magnetostrictive effect in the waveguide 16.

The component of the wave 17 which reaches the distal end of the waveguide 16 is preferably damped by the damping material 26, to prevent it from reflecting and possibly interfering with future measurements. On the proximal end of the waveguide 16, the mechanical wave 17 passes by the coil 22, where it is converted to an electrical signal. This conversion results in an electrical signal 23 being produced at the terminals of the coil 22. (If a piezoelectric crystal were used instead of the coil 22, movement of the waveguide 16 would impart a strain to the crystal which would produce a corresponding voltage pulse from the crystal. Magnetostrictive tape or sensing tape could also be utilized to make the conversion from mechanical wave to electrical signal.) As known in the art, the travel time of the wave 17 from the magnet 19 to the coil 22 is directly proportional to the distance of the magnet from the coil. In particular, the following equation can be used which relates the position of the magnet 19 to the travel time:

$$D=v*t,$$

where D is the distance between the coil 22 and the magnet 19, t is the time it takes for the wave 17 to travel from the magnet 19 to the coil 22, and v is the propagation velocity of the waveguide 16.

Accordingly, knowing the propagation velocity v and the time t, the distance of the magnetic marker 19 can be determined. Subsequently, the position of the movable mass 52 is known. Because the initiation of the wave 17 at the magnet 19 is nearly instantaneous with initiation of the current pulse 39, and because the reception of the wave 17 at the coil 22 is nearly instantaneous with the generation of the return pulse 23, the time t can be closely approximated by measuring the time between the generation of the current pulse 39 and the receipt of the return pulse 23, as known in the art. Thus, if the propagation velocity v and time t are known, the distance D can be calculated. As an example, if the time t were measured to be 100.1234 microseconds and the propagation speed of the waveguide 16 was known to be 2830 meters per second, the distance of the magnet 19 would be about 0.283349222 meters.

As shown in the embodiment of FIG. 3, a timer and position calculation circuit 34 are provided to measure the time t and to make the calculation of the distance D. As known in the art, this circuit 34 can be provided as discrete timing and calculation circuitry, as part of an application-specific integrated circuit (ASIC), as a programmed controller or processor, or as a programmable logic device, for example.

The electronic circuitry 30 of this embodiment also includes encoder synthesizer circuitry 40 for converting the calculated position from the circuit 34 to the A and B output pulse signals 45 and 46. In particular, in the embodiment shown, the encoder synthesizer circuit 40 includes a velocity command generator circuit 41 which communicates a velocity command to a digital-to-analog convertor (DAC) 42. The output of the DAC 42 is then provided to a voltage-to-frequency convertor (VFC) 43, which provides a variable frequency signal to an encoder signal generator circuit 44. The output of the encoder signal generator 44 is an "A quad B" signal which is then communicated to the control system 54, which has incremental encoder inputs for A and B signals.

Preferably, the velocity command generator 41 produces a velocity command based upon the rate of change of the calculated position received from the timer and position calculator 34. A velocity calculator 60 can be used to calculate the velocity from the calculated position. For example, the velocity calculator 60 could store a previous calculated position from a previous measurement interval, subtract the previous calculated position from the current calculated position of the present interval, and divide the difference by the value of the interval. Thus, if the previous calculated position from the position calculator 34 was 3.9 meters during the previous measurement interval, if the current calculated position from the position calculator is 4.0 meters, and if measurements are made once every millisecond, the velocity would be (4.0–3.9) meters divided by 0.001 seconds, which equals 100 meters per second.

While it is contemplated that the velocity alone could be used to produce the velocity command, as shown in the embodiment of FIG. 3, it is preferred that a feedback loop is used to adjust the velocity command as needed. In particular, in this embodiment, electronics 30 includes a decoder circuit 48 and associated software or firmware to determine the absolute position using the A and B signals 45 and 46 (such as would be done in the control system 54).

This decoding can be accomplished by using a pair of pulse generators, one that produces clock pulses when the A signal 45 lags (in phase) the B signal 46, and one which produces clock pulses when the A signal 45 leads the B signal 46. These clock pulses can then be provided to a pair of corresponding counters on a counting circuit, one counter for counting the leading clock pulses and one counter for counting the lagging clock pulses. The counting circuit could comprise, for example, the PCI-20007M-1A integrated circuit, manufactured by Intelligent Instrumentation of Tucson, Arizona. Using such a device, the two counts can then be compared to one another, such as by using a software comparison, and the relative position is determined by the difference. Preferably, during a reset event where the relative position would be lost (such as power up for example) the decoder circuit 48 receives the calculated position from the position calculator 34 to establish the reference from which the relative position is calculated. Other types of decoder circuits are also possible, such as one which adds to a running counter when A leads B, and subtracts from the counter when B leads A. For instance, the HCTL-2020 quadrature decoder/counter interface integrated circuit, made by Hewlett Packard, could be utilized, along with appropriate software and/or firmware if desired.

The control system 54 also preferably includes the same or similar decoder circuit to keep a running count of the incremental signals 45 and 46. The control system 54 could also include software which receives the calculated position from the calculator 34 during a reset, and which then uses this calculated position as a reference from which to add or subtract the running count. As an alternative, if the control system 54 has a Z channel input, this channel could be utilized to transmit a pulse to the control system 54 whenever a particular reference point is reached along the measurement stroke of the waveguide 16, as indicated by the calculated position from the position calculator 34. For example, whenever the absolute position of 10 mm is reached, a pulse could be sent on the Z channel, and the control system 54 could include software which then reads its decoder count and uses that count as a reference. Incremental deviations from the reference count can then be added to or subtracted from 10 mm by the software to arrive at the absolute position. Other suitable methods for obtaining a reference point for counting could be used by the control system 54 as well.

Accordingly, the decoder circuit 48 produces a synthesized position signal, and this signal is fed back to the velocity command generator 41. A difference unit 62 can be included in the velocity command generator 41 to produce a position error by subtracting the synthesized position from the absolute position from the position calculator 34. Using a multiplier 64, the position error can then be multiplied by a position gain Kp. Another multiplier 66 can be used to multiply the velocity from the velocity calculator 60 by a velocity gain Kv. The product of the position error and gain Kp can then be added to the product of the velocity and gain Kv by a summer 68, to produce the velocity command output of the velocity command generator 41. Thus, the velocity command is based upon the calculated velocity (i.e., rate of change of the calculated position), and is also preferably based upon a position error from a feedback loop, in order to automatically and periodically ensure accuracy between the absolute calculated position signal and the absolute synthesized position signal which is derived from the incremental signal (e.g., by using software and/or a decoder). The gains Kp and Kv of blocks 64 and 66 respectively can be adjusted as desired to achieve optimum feedback control. In addition, the gains can also be utilized to convert the position error and velocity into the appropriate units for the velocity command. For example, if it is desirable to represent the rate of change command in units of m/s, then the gain Kp can be in units of 1/s, and the gain Kv can be without units (because the velocity is already in units of m/s).

Because the velocity command generator 41 is easily implemented in digital circuitry, such as a programmable processor for example, the velocity command will often be a digital signal (although analog circuitry could be used if desired). When the velocity command is a digital signal, it is preferred that it is converted to an analog voltage signal by the DAC 42. Any suitable digital to analog convertor can be utilized for this purpose. Preferably, the output of the DAC 42 is a DC voltage signal. The amplitude of the DC voltage varies in proportion to the absolute value of the velocity command from the velocity command generator 41.

In the embodiment of FIG. 3, the analog voltage signal from the DAC 42 is fed to the VFC 43, where it is converted to a variable frequency signal, the frequency of the variable frequency signal being proportional to the amplitude of the analog voltage signal. The VFC 43 could comprise any mechanism capable of expressing a signal's amplitude in terms of a frequency. By way of example, the Burr Brown VFC100 or the Analog Devices AD654 could be utilized. Also, the VFC output 43 could be any of a variety of variable frequency signals, depending on the type of VFC used. As an example, the VFC 43 could produce a variable frequency square wave or sine wave signal.

The variable frequency signal from the VFC 43 is fed to an encoder signal generator (ESG) 44, which uses the variable frequency signal to produce the A and B signals 45 and 46 in quadrature (phase shifted by 90 degrees). For example, if the output of the VFC 43 were a sine wave, the signal could be converted by the ESG 44 to a series of pulses, such as by using a comparator. When the amplitude of the sine wave exceeds a reference value, then a high pulse can be output from the comparator and when the amplitude falls below the reference value, a low pulse (or no pulse) can be generated. This resulting square wave signal could be used for one of the incremental signals (45 or 46). To obtain the other incremental signal (45 or 46), the ESG 44 can include a phase shifter to shift the phase of the square wave signal by the desired amount (usually 90 degrees). Of course, if the VFC 43 produced a square wave signal of varying frequency, rather than a sine signal of varying frequency, no comparator or squaring circuitry would be needed. In this case, the ESG 44 could use the square wave of the VFC 43 as the first of the two incremental signals, and would only need to phase shift the square wave signal to produce the second of the incremental signals.

Once the two incremental signals are generated, the ESG 44 should provide the signals on the correct channels (45' and 46'), so that the direction of the velocity is correctly represented. To achieve this, the ESG 44 can determine whether a positive or negative velocity command has been generated (i.e., whether the calculated position is increasing or decreasing). This can be achieved internally by the ESG 44 by comparing the frequency of the signal from the VFC 43 to a predetermined threshold frequency which represents the transition from a positive to a negative velocity, such as a frequency of zero (i.e. a DC output). Alternatively, the sign (+ or −) of the velocity can be provided by the velocity command generator 41 to the ESG 44.

Accordingly, based on the sign of the velocity, the ESG 44 can provide the leading square wave on the A output channel 45' for an increasing value and on the B output channel 46' for a decreasing value (or vice versa). Whatever channel (45' or 46') the ESG 44 decides to provide the leading pulses, the phase shifted pulses should be provided on the other channel (45' or 46').

For example, if the protocol were set up such that a leading A signal indicates an increasing position and a leading B signal indicates a decreasing position, and if the ESG 44 determined that the velocity were positive, then the leading square wave pulse series which is created would be output on the A channel 45'. The ESG 44 could then use the phase shifter, or other appropriate shifting or delay circuitry, to shift the pulse series by 90 degrees and output the shifted pulses on the B channel 46'. In the opposite case, when the velocity is decreasing, the leading pulses would be output by the ESG 44 on the B channel 46', and the phase shifted pulses would be output on the A channel 45'.

As an alternative to such a switching of channels based upon the sign of the velocity, the ESG 44 could simply adjust its phase shifting circuitry to +90 degrees for a positive velocity and —90 degrees for negative velocity (or +90 degrees for a negative velocity and −90 degrees for a positive velocity, if desired). In this alternative, no switching of the two signals between the output channels 45' and 46' would be necessary, as the change in phase shift would account for the sign of the velocity.

Thus, the transducer 10 appears to the control system 54 as an encoder. More specifically, the DAC/VFC/ESG combination produces a synthesized encoder output 45 and 46 whose resolution is a function of the velocity command input from the DAC 42. Using a 16-bit DAC 42, for example, will produce 65,536 possible levels of voltage, resulting in 65,536 possible levels of output frequency for the synthesized encoder signals 45 and 46. Thus, the signals 45 and 46 can very accurately represent the actual speed and position of the transducer. This high resolution has an advantage over microprocessor-based encoder synthesizers, because the resolution is not limited by a fixed clock. Because the output of the DAC/VFC/ESG combination is a function of the transducer velocity, the synthesized position represented by the signals 45 and 46 can be in error. However, as noted above, the embodiment preferably includes a feedback loop for correcting for position errors. The synthesized position is monitored by the decoder 48 and is subtracted from the actual transducer position which is provided by the timer/position calculator circuit 34. The resulting position error (if any) is multiplied by the gain constant Kp and added to the velocity command. Accordingly, the position loop is closed, and increases in position error will cause a modification to the synthesized encoder frequency so as to adjust for the position error.

As can be understood, a microprocessor or microcontroller is well suited for many of the control loop functions of the velocity command generator 41, including accepting transducer position and velocity data, making a velocity calculation (if velocity data is not provided directly from the transducer), and performing corresponding gain calculations. In such a device, the update rate for the position control loop typically would be periodic, and the gains Kp and Kv could be adjustable to minimize the overall position and velocity error. Also, the microcontroller-based velocity command generator 41 could write a digital signal to the ESG 44 to indicate positive or negative velocity direction, so that the ESG knows which signal (A or B) should be phase shifted to lag the other.

Figure 4:
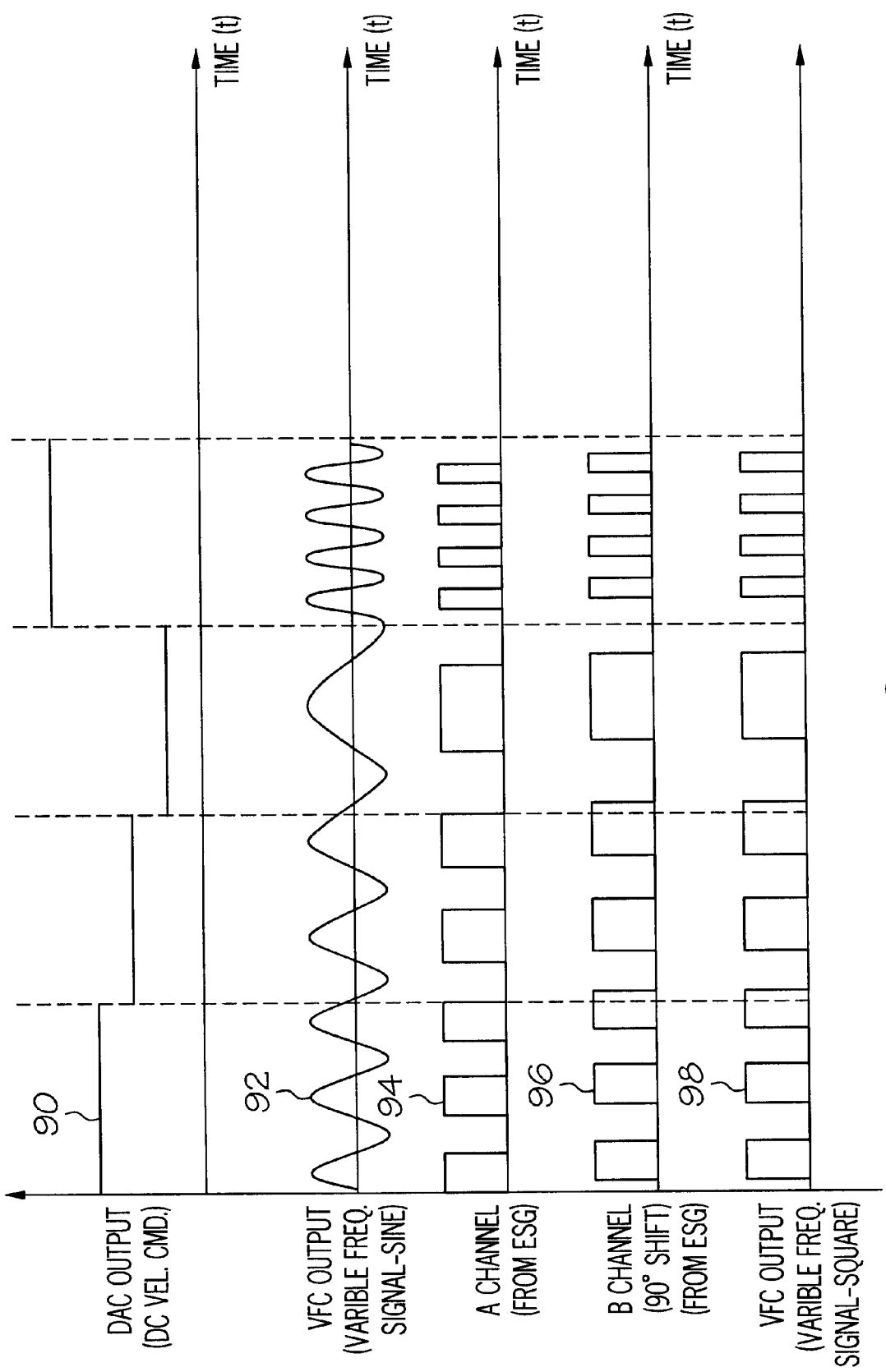
FIG. 4 is a timing diagram of exemplary signals of an encoder synthesizer circuit such as illustrated in FIG. 3.

FIG. 4 shows an example of an A output signal 94 and a B output signal 96 which could correspond to the encoder signal generator output of FIG. 3. As seen in this figure, in this embodiment, the A and B signals 94 and 96 have a varying frequency which varies in direct proportion to the variable frequency signal 92 of the VFC. As described above, the variable frequency signal 92 has a frequency which varies in proportion to the level of the analog velocity command signal 90 from the DAC. As shown in FIG. 4, the B signal 96 is phase shifted ninety degrees with respect to the A signal 94. Whether B lags or leads A by ninety degrees depends on the sign of the velocity command 90, and, as shown in FIG. 4, the protocol can be set up such that B lags A when the velocity is positive and leads A when the velocity is negative. As an alternative, the protocol could be established such that B leads A when the velocity is negative and lags A when the velocity is positive. In either case, the control system being used should be informed of the protocol that is established. The switch from a positive to a negative velocity, or vice versa, can be indicated by the frequency of the variable frequency signal 92 of the VFC, and this indication can switch the leading/lagging nature of the A and B signals 94 and 96. For example, a frequency of zero for a given period of time might indicate the switch. Alternatively, the sign of the velocity can be utilized to drive the phase lag of the A and B signals 94 and 96.

As shown in FIG. 4, the frequency of the A and B signals 94 and 96 increase as the magnitude of the velocity command 90 increases. Preferably, the duration of the pulses decreases when the velocity increases, such as occurs with a square wave, and as also shown in FIG. 4 Accordingly, for a given time interval, more A and B pulses will be created for a high velocity than for a low velocity. Thus, the decoder circuit which counts the pulses (or pulse transitions) to obtain a position value, will count more pulses (or pulse transitions) in the same period of time for a high velocity command 90 than for a low velocity command. Consequently, not only do the pulses 94 and 96 accurately reflect the position of the magnet (by the number of pulses), they also accurately reflect the velocity of the magnet (by the frequency of pulses).

FIG. 4 also shows an exemplary square wave variable frequency output signal 98. As noted above, if the VFC produces such an output, the ESG could simply include phase shifting circuitry to shift the phase signal of the variable frequency signal 98 so as to produce a second signal that lags the original by ninety degrees. The ESG could determine on which line (line A or line B) to provide the leading signal and on which line to provide the phase-shifted lagging signal according to the sign of the velocity command, as described above. For example, in FIG. 4, the square wave variable frequency signal 98 is provided as the B signal 96 and the phase-shifted version of the variable frequency signal 98 is provided as the A signal 94. This condition (B leading A) would represent either a positive or negative velocity situation, and the opposite condition (A leading B) would represent the other velocity situation.

Figure 5:
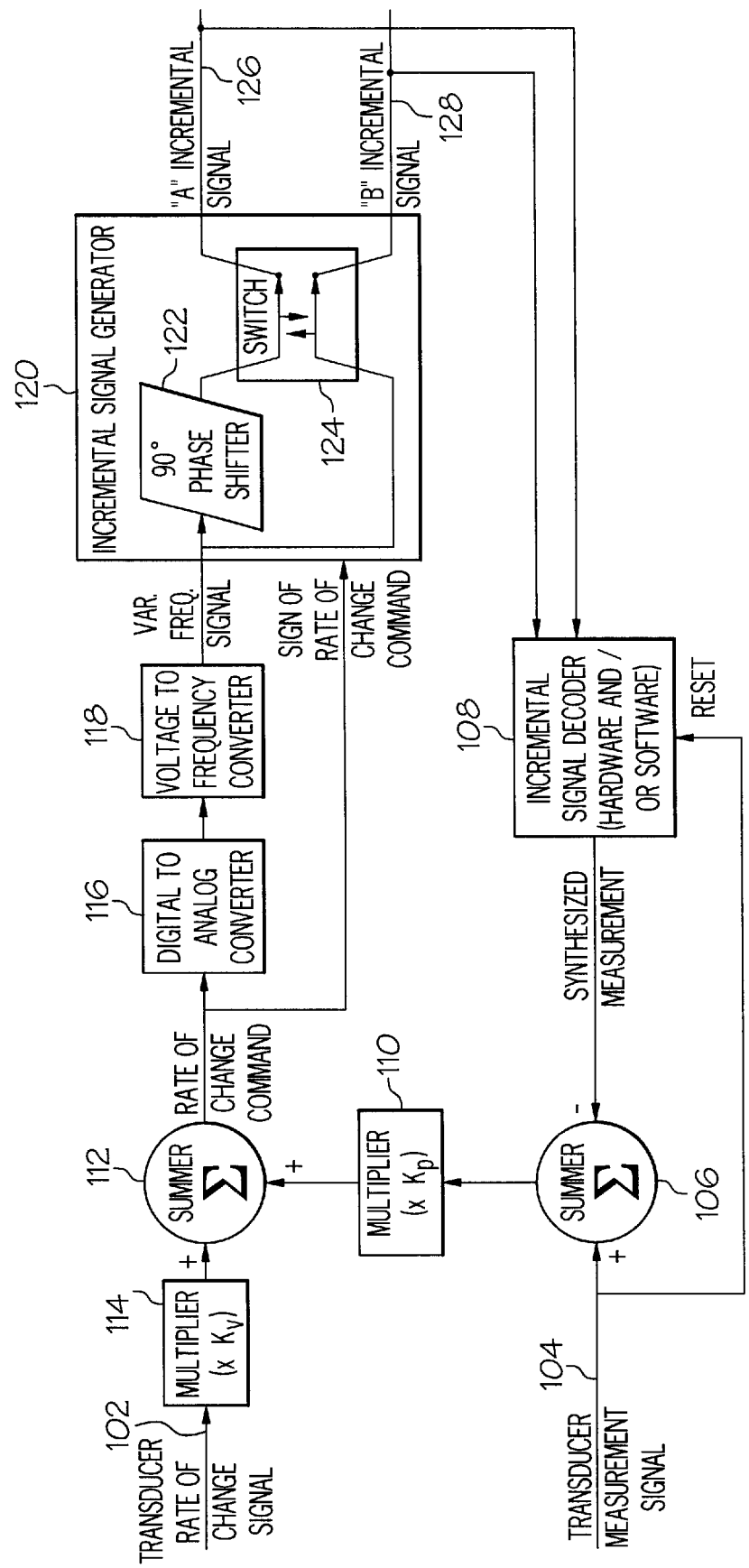
FIG. 5 is a control diagram illustrating an embodiment of an incremental signal synthesizer circuit with feedback control, according to principles of the present invention.

FIG. 5 is a control diagram illustrating another embodiment of an encoder synthesizer system, made according to principles of the present invention. In this embodiment, the transducer rate of change signal (e.g., velocity) is provided on line 102, and the transducer measurement signal (e.g., position) is provided on line 104. At a summation junction 106, the synthesized measurement from a decoder 108 is subtracted from the transducer measurement signal 104, to create a measurement error signal. A multiplier junction 110 is preferably provided to multiply the measurement error by a gain value Kp. Similarly, the transducer rate of change signal from line 102 is preferably multiplied by a gain value Kv at junction 114. The outputs of the multiplication junctions 114 and 110 are then added at summation junction 112 to produce a rate of change command. Thus, the rate of change command is preferably based on, or derived from, the rate of change signal and the measurement error.

In this embodiment, a digital-to-analog convertor (DAC) 116 is provided to change the rate of change command from a digital format to an analog format, and to provide this analog rate of change command as a voltage signal to a voltage-to-frequency convertor (VFC) 118. However, if the rate of change command is already provided in an analog voltage format, then the DAC 116 may not be necessary. Alternatively, if the VFC 118 accepts a digital input, then the DAC 116 would not be necessary.

The output of the VFC 118 is a variable frequency signal which has a frequency which varies in proportion to the rate of change command. Preferably, the VFC 118 provides a square wave signal (or series of pulses) with variable frequency, such as signal 98 of FIG. 4 for example. The variable frequency signal is provided to an incremental signal generator 120. In this embodiment, the incremental signal generator 120 includes a ninety degree phase shifting circuit 122 which produces a second variable frequency signal which is substantially identical to the first variable frequency signal, except that it lags the first signal in phase by ninety degrees. Any phase shift circuit can be utilized for this purpose, and such a circuit could comprise discrete components or it could comprise an integrated device.

Preferably, the incremental signal generator 120 also includes a switch 124 which is driven based on the sign (positive or negative) of the rate of change command. For example, if the rate of change command were positive, the switch 124 would provide the phase shifted signal on the "A" output line 126, and the variable frequency signal on the "B" output line 128. In the opposite case, if the rate of change command were negative, the switching would be reversed: the phase shifted signal would be provided on the "B" output line 128, and the variable frequency signal would be provided on the "A" output line 126. (As can be understood, the opposite switching protocol could be established, if desired.)

The incremental signal decoder 108 includes hardware and/or software which keeps a running tally of the pulses by adding or subtracting them from a reference number. In this manner, the decoder 108 can determine the measurement value and provide it as a synthesized measurement output signal which is fed back to the summation junction 106. (As can be understood, the decoder 108 could reside in the control system, in the transducer, or as a separate component.) In order to establish the reference value from which counting should begin, such as at a reset event, the absolute transducer measurement signal from line 104 can be provided to the decoder after such an event.

Accordingly, the system of FIG. 5 can accurately provide two incremental signals, on lines 126 and 128 respectively. These incremental signals accurately represent the measurement signal, (by the number of pulses), as well as the rate of change of the measurement signal, (by the frequency of the pulses). The system of FIG. 5 allows the transducer to be interfaced with a control system that requires incremental input signals rather than absolute input signals. The feedback loop in the system of FIG. 5 ensures the output signals on lines 126 and 128 remain accurate.

Figure 6:
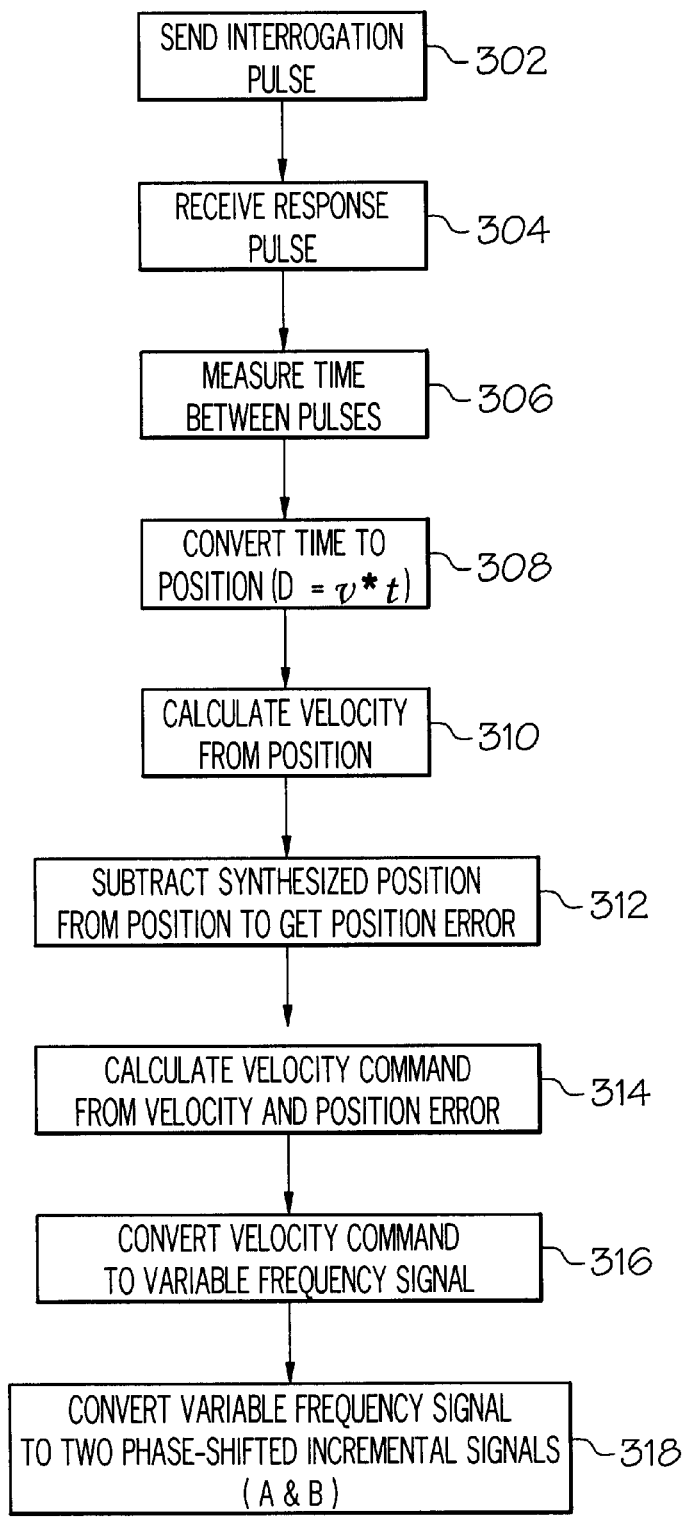
FIG. 6 is a flow diagram illustrating a method of generating an incremental output signal, according to one embodiment of the present invention.

FIG. 6 is a flow diagram illustrating a method of converting an absolute measurement of a linear position transducer to an incremental signal, according to one embodiment of the present invention. In this embodiment, at step 302 an interrogation pulse is generated, such as through a waveguide. In response to the interrogation, a response pulse is received at step 304, such as by converting a mechanical wave in the waveguide to an electrical pulse using a mode convertor for example. The time between the two pulses can then be measured, at step 306, and the measured time converted to a position, at step 308, such as by using the known relationship between position (D), propagation velocity (v), and the measured time (t).

Using the calculated position, a velocity can be calculated. This step is shown at block 310 of FIG. 6. As described above, one way to calculate velocity in a periodic measurement system would be to save the previous position measurement, subtract the calculated position from the previous measurement, and divide the difference by the time interval between the two measurements. Preferably, this time interval is relatively small, such as a millisecond for example. An alternative way to determine velocity is to calculate the derivative of the position signal.

At step 312 of FIG. 6, a synthesized position is determined (from the incremental signals provided at step 318), and this synthesized position is subtracted from the calculated position (of step 308) to get a position error. Based on this position error and the calculated velocity (of step 310), a velocity command can be calculated, at step 314, such as by adding the position error and calculated velocity. Preferably, as described above, a gain is applied to the velocity and a gain is applied to the position error prior to adding the two values.

Once the velocity command is calculated, the command can be converted to a variable frequency signal. This step is shown as block 316 of FIG. 6. As described above, if the velocity command is represented by a voltage, a voltage to frequency convertor may be utilized to conduct this step. However, it should be understood that any device for converting the velocity command to a variable frequency signal could be utilized. For example, if the velocity command were represented by an electrical current signal, a current-to-frequency convertor could be utilized.

After the variable frequency signal has been generated, step 318 can be executed to convert the variable frequency signal to a pair of incremental signals. As noted above, if the variable frequency signal is already a square pulse signal (or is converted to a variable frequency square pulse signal), then this square pulse signal (or frequency multiple thereof) can be provided as one of the incremental signals. The second incremental signal can be provided by shifting the phase of this square pulse signal by the desired amount (e.g. ninety degrees).

Figure 7:
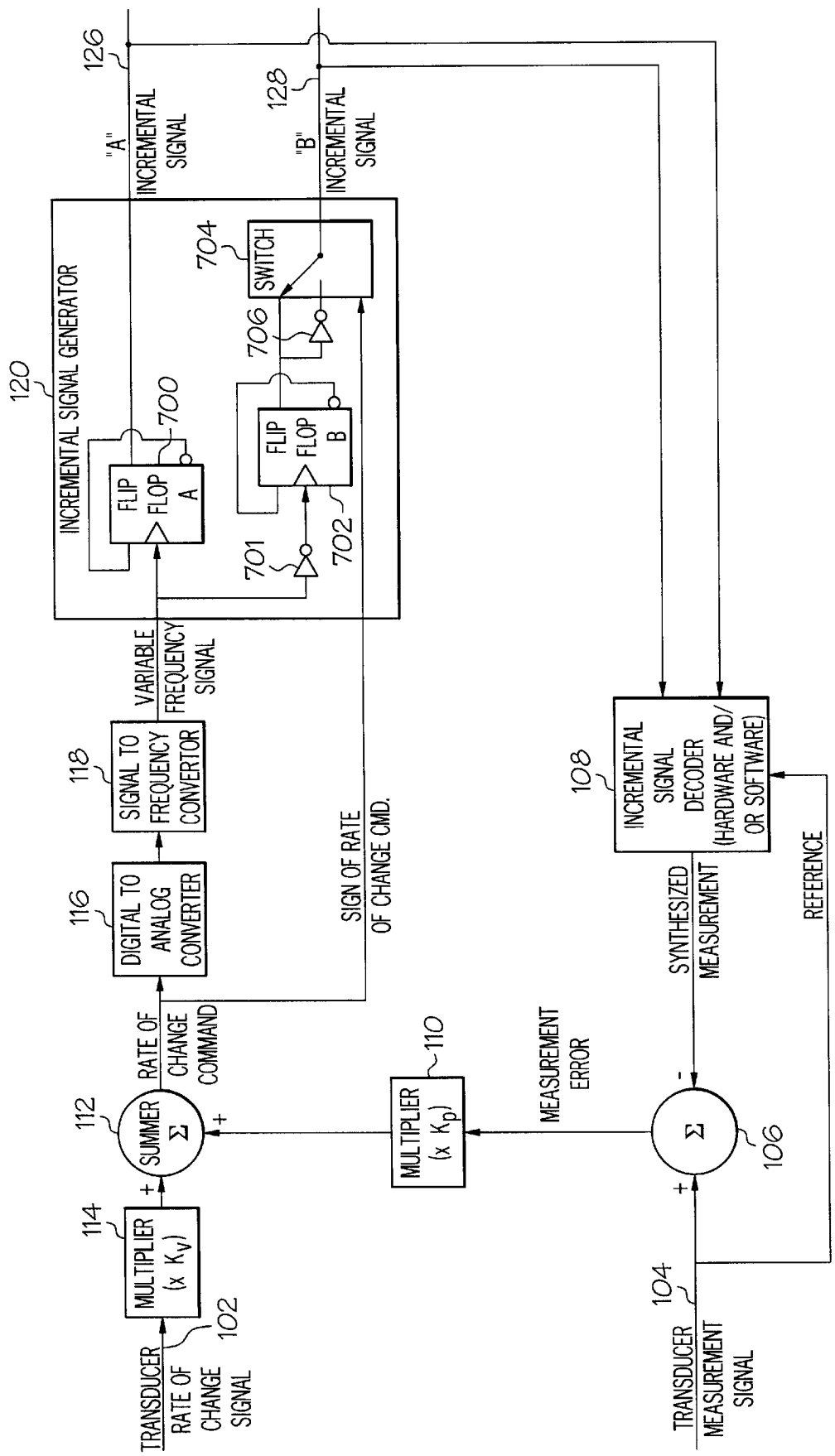
FIG. 7 is a block diagram illustrating an embodiment of an incremental signal emulation system which is driven by a variable frequency signal and which includes feedback control, in accordance with principles of the present invention.

FIG. 7 illustrates another embodiment of an incremental signal generation system made according to principles of the present invention. This embodiment operates in a similar manner as the embodiment of FIG. 5, except that the operation of the incremental signal generator circuit differs somewhat. In particular, the transducer measurement signal is provided on line 104, and the rate of change of that measurement signal is provided on line 102. For example, if the transducer measurement is a position measurement, then the rate of change would represent velocity.

At junction 106, a measurement error is determined by calculating the difference between the input to the system and the output of the system. In particular, the difference between the transducer measurement on line 104 and a feedback measurement from an incremental signal decoder 108 is determined. The decoder 108 keeps track of the measurement which is represented by the output of the system (i.e., the incremental signal A from output line 126 and the incremental signal B from output line 128). The incremental signal decoder 108 could include any of a variety of appropriate decoder processors or circuitry, such as, for example, the HCTL-2020 quadrature decoder/counter interface integrated circuit, made by Hewlett Packard, along with appropriate software and/or firmware. In order to know where to begin counting, the transducer measurement signal from line 104 can also be provided to software in the decoder 108 as a reference whenever needed, such as after a resetting event for example.

Preferably, the measurement error from the junction 106 is multiplied by a gain Kp at junction 110. Similarly, it is preferred that the rate of change signal on line 102 is multiplied, at junction 114, by a gain value Kv. The outputs of the junctions 110 and 114 are then added at junction 112 to produce a rate of change command. Preferably, the rate of change command is in a digital format, as the operation of the junctions 106, 114, 112, and 110 are well suited for implementation in digital circuitry or a digital processor or controller. If the rate of change command is in digital format, it can be converted to an analog format, if need be, by a digital-to-analog convertor 116. The analog version of the rate of change command is then fed to a signal-to-frequency convertor circuit 118, which produces a variable frequency signal, the frequency of which represents the rate of change command. Accordingly, the variable frequency signal has a frequency which is based upon the rate of change command, which is based upon the transducer rate of change signal and the feedback measurement error signal. If the rate of change command were an analog voltage, the signal-to-frequency convertor circuit 118 could comprises a voltage-to-frequency convertor. An example of such a device, is the AD654 voltage-to-frequency converter, made by Analog Devices.

The variable frequency signal from the signal-to-frequency converter 118 is then fed to the incremental signal generator 120, which produces the A and B incremental signals. Exemplary circuitry for the incremental signal generator 120 is shown in FIG. 7. In particular, the variable frequency signal may be fed to a first flip-flop circuit 700, which produces a square wave which is triggered by each positive or rising edge of the variable frequency signal pulses. As an example, a D flip flop could be utilized for this purpose, such as the 74F74 D flip flop, manufactured by Philips Semiconductors and others. The output of the first flip flop 700 is provided as the "A" incremental signal on line 126.

To produce the second incremental signal, the "B" signal, a second flip flop 702 is provided. However, this flip flop 702 is triggered by each negative or falling edge of variable frequency signal pulses. To achieve this, a negative-edge triggered flip flop circuit could be utilized. However, if a positive-edge triggered flip flop is utilized for flip flop 702, it can mimic a negative-edge triggered device by inverting the variable frequency signal before inputting the signal to the flip flop. Accordingly, an inverter 701 is provided to invert the variable frequency signal, and to allow flip flop 702 to be triggered off the positive edge of the inverted signal.

Thus, the output of the flip flops 700 and 702 are staggered in phase. To control which signal leads the other, a switch 704 can be utilized which is controlled by the sign (positive or negative) of the rate of change command. The switch 704 controls whether the A signal leads the B signal, or vice versa, based upon the sign of the rate of change command. Thus, for example, a leading A signal might indicate a positive rate of change, and a leading B signal might indicate a negative rate of change command. Of course, the opposite protocol could be established if desired, and the protocol which is used should be made to match that used by the decoders (such as decoder 108) which will receive the A and B signals from output lines 126 and 128. To make the B signal lead the A signal, the switch 704 could connect the output line 128 directly to the output of the flip flop 702. To make the B signal lag the A signal, the switch 704 could connect the output line 128 to the output of an inverter 706, which inverts the output of the flip flop 702. By providing the B signal as the output of the inverter 706, the B signal will lag the A signal. By providing the B signal as the output of the flip flop 702, the B signal will lead the A signal.

Accordingly, the A and B signals on lines 126 and 128 respectively synthesize the transducer measurement by the number of pulse transitions provided on one of these lines. Moreover, the rate of change of the transducer measurement is accurately synthesized by the frequency of the pulses provided on these lines 126 and 128. By keeping track of the synthesized measurement represented by these pulses and feeding this synthesized measurement back in a feedback control loop, the accuracy of the A and B signal output is tightly maintained. Moreover, the feedback control loop can compensate for any inaccuracies of the system components. For example, any non-linearity of the circuit 118 or other system component will be compensated by the feedback control loop.

For extremely slow rates of change, better resolution may be obtained by bypassing the circuits 116, 118, and 120, and calculating the incremental signals, such as by using a microcontroller or other digital device. Alternatively, it may be desirable to use the signal to frequency convertor 118 for higher rates of change, and a second signal to frequency convertor for lower rates of change. Such a configuration will help to allow low rates of change to be represented with good frequency resolution of the incremental signals.

Figure 8:
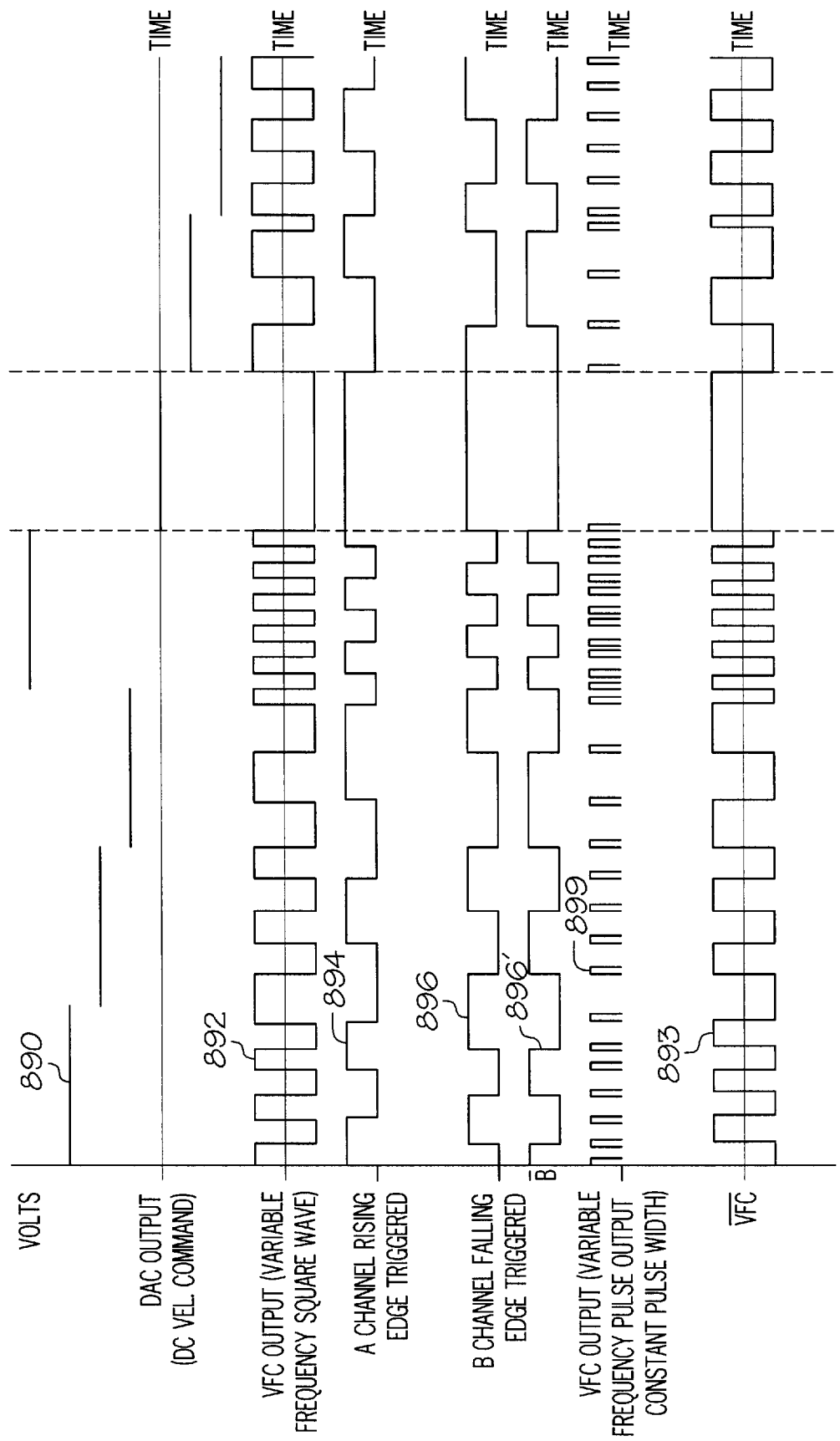
FIG. 8 is a timing diagram of exemplary signals of an incremental signal emulation system such as illustrated in FIG. 7.

FIG. 8 is a timing diagram of exemplary signals that could be provided by the incremental signal emulation system of FIG. 7. In this example, the rate of change is represented by the amplitude of a DC analog voltage 890. The frequency of the variable frequency output signal 892, from the signal-to-frequency convertor, varies in proportion to the absolute value of the DC analog voltage 890. The A channel output 894 is triggered from each rising edge of the variable frequency output signal 892, such as by using a flip flop for example. Moreover, as can be seen in FIG. 8, the B channel output 896 is triggered based upon each falling edge of the variable frequency signal 892. As noted above, this could be achieved by using a negative-edge triggered flip flop. Another possibility would be to invert the variable frequency signal 892 to produce an inverted variable frequency signal 893. The B signal 896 could then be triggered off the rising edges of the inverted variable frequency signal 893.

The A and B signals 894 and 896 can be provided for positive rate of change values. Thus, in this example, the B signal 896 would lag the A signal 894 for such values. If this protocol is used, then for negative rate of change values, the A signal 894 should lag the B output signal. To achieve this, for negative rate of change values, the B signal 896 can be inverted to produce an inverted B signal 896', and this inverted signal can be provided as the B output signal. Thus, for these rate of change values, the A signal 894 lags the inverted B signal 896'.

In the example of FIG. 8, the analog voltage signal 890 switches from positive to negative at the time instance 898. Accordingly, at this instance, the phase relationship between the A and B output signals should be reversed. To achieve this, the inverted B signal 896' can be provided as the B output signal, rather than the non-inverted B signal 896.

A number of methods can be utilized to recognize that the sign of the rate of change signal 890 has reversed, and to switch the output from the B signal 896 to the inverted B signal 896'. For example, a switch can be utilized which is operated based upon the polarity of the signal 890, or is based directly upon the sign of the rate of change command. As another alternative, the switch could recognize when the frequency of the variable frequency output signal 892 is zero for a given time period, and could then switch the B output line at that point. In the example of FIG. 8, the variable frequency output signal 892 has a zero frequency between the time instance 897 and the time instance 898, and this zero frequency corresponds to the zero amplitude of the analog voltage signal 890 during this time period. Once this frequency is reached, the switching could be reversed.

While the variable frequency signal 892 is preferably a square wave, some signal-to-frequency convertors will not produce a square wave signal. Rather, such converters might produce a signal which resembles the signal 899 of FIG. 8, wherein the pulse width is kept substantially constant, but the pulse frequency varies based upon the input (e.g., the rate of change command signal 890). It is contemplated that an incremental signal generator could be operated off of such a signal, such as by using flip flops for example. However, if it is still desired to operate the incremental signal generator off a square wave variable frequency signal, the pulsed signal 899 can be "squared up" by any appropriate square wave conversion method or apparatus. For example, a flip flop could be utilized to change the pulsed signal 899 to a square wave signal, and the square wave signal could then be provided to an incremental signal generator circuit to produce the A and B signals, such as in the manners described above for instance.

With most VFC's, the output frequency range can be adjusted. For example, if it is known that the maximum rate of change was going to be 10 m/s, a frequency could be selected to represent this rate of change. If the frequency selected were 100 kHz, then each cycle in the variable frequency signal 892 would represent 0.001 meters. Accordingly, in this example relating to linear location sensing, each rising or falling edge of the A signal 894 would represent a 0.001 meter increment in the transducer measurement. Similarly, each rising or falling edge of the B signal 896 would represent a 0.001 meter increment in the transducer measurement. Either one of the signals 894 or 896 could be monitored to conduct the counting by the 0.001 meter increments, and whether the increments are added or subtracted from the count would depend on the phase of the A and B signals, as discussed above. In this example, if the rate of change were found to be 1 m/s, the variable frequency signal 892 would have a frequency of 10 kHz. If the rate of change update interval was 1 millisecond, then the variable frequency signal 892 would produce 10 pulses during the update interval. This would correspond with five pulses on the A or B channels 894 and 896, which have 10 transitions (rising or falling edges). One of the signals 894 and 896 can be monitored and each transition of this signal could be counted as a 0.001 meter increment by the decoder(s) receiving the signals, resulting in a total change in the synthesized transducer measurement count of 0.01 meters. Alternatively, both of the signals 894 and 896 could be monitored and each transition of either signal would represent a 0.0005 meter increment. If the rate of change were 1 m/s, 20 transitions would result in these signals, and each transition could be counted as a 0.0005 meter increment, resulting in a total change of 0.01 meters. Whether the count increases or decreases would depend on the phase relationship between the A and B signals 894 and 896.

As will be understood, such adjustments could be implemented in similar fashion for applications directed to the measurement of other conditions, parameters, or variables, such as temperature or pressure for example.

Figure 9:
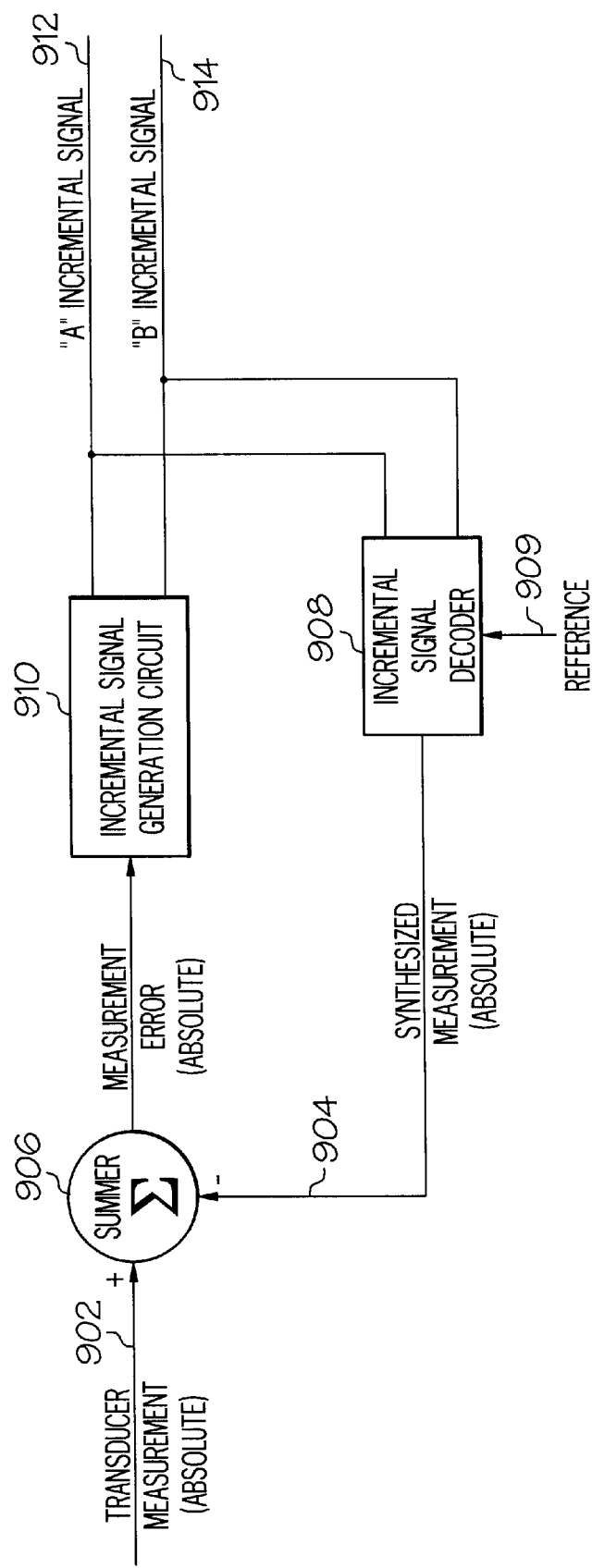
FIG. 9 is a control diagram illustrating another embodiment of an incremental signal generation system having feedback control, according to principles of the present invention.

FIG. 9 is a control diagram illustrating another embodiment of an incremental signal generation system having feedback control, according to another embodiment of the present invention. In this embodiment, the incremental signal generation system is operated based upon a measurement error feedback signal. In particular, the system includes an incremental signal decoder 908 which is used to convert the A and B incremental signals, from lines 912 and 914, to an absolute measurement signal. A measurement reference signal 909 can be provided so that the decoder 908 knows where to begin counting the A and B incremental signals. Preferably, the A and B signals on lines 912 and 914, respectively, are in quadrature. The difference between the absolute transducer measurement, provided on line 902, and the absolute synthesized measurement signal, provided on line 904 is computed at junction 906. The resulting measurement error signal is then fed to the incremental signal generator 910, which can comprise digital circuitry or processor-driven circuitry, and which produces the A incremental signal on line 912 and the B incremental signal on line 914.

The number of pulses provided in the A and B signals is based upon the measurement error signal, and whether these pulses represent a decrease or increase in position is determined by the phase relationship between the A and B signals. Preferably, the incremental signal generator 910 adjusts the phase relationship between the A and B signals based upon the sign (positive or negative) of the measurement error input. For example, a positive measurement error could be represented by A leading B, and would result in an increase in the synthesized measurement by the incremental signal decoder 908. In this example, a negative measurement error could be represented by B leading A, and would result in a decrease of the synthesized measurement by the incremental signal decoder 908.

Thus, because the system of FIG. 9 is based upon a measurement feedback error signal, high accuracy of the system output is ensured. Changes in the transducer measurement on line 902 result in corresponding changes to the measurement error signal from junction 906. Subsequently, A and B pulses are created on lines 912 and 914 respectively by the incremental signal generation circuit 910, the phase lag between the A and B pulse streams representing the direction of the measurement change.

The foregoing descriptions of the preferred embodiments of the invention have been presented for purposes of illustration and description only. They are not intended to be exhaustive or to limit the invention to the precise forms disclosed, and modifications and variations are possible and contemplated in light of the above teachings. While a number of preferred and alternate embodiments, methods, systems, configurations, and potential applications have been described, it should be understood that many variations and alternatives could be utilized without departing from the scope of the invention.

For example, it should be understood that the invention can be used in a variety of sensors, and should not be limited to magnetostrictive linear position transducers. For such sensors, the rate of change of the measurement variable can be provided to produce the variable frequency signal, which can then be converted to a pair of incremental signals. Also, while the incremental signal described above with respect to FIG. 4 has a frequency that is substantially equal to that of the variable frequency signal, it should be understood that it is also possible to base the frequency of the incremental signal from the variable frequency signal in other ways. For example, the incremental signal could have a frequency which is a multiple of the frequency of the variable frequency signal. For instance, in FIG. 8, the incremental signal has a frequency which is over one-half that of the variable frequency signal.

Moreover, although a variety of potential circuit configurations and components have been described, it should be understood that a number of other configurations and components could be utilized without departing from the scope of the invention. As known in the art, separate components can be combined in an integrated circuit, processor, or programmable device, and integral components can comprise a number of discrete devices and/or separate circuits. The invention can be embodied in analog or digital circuitry. Also, wired connections or communication links can be made wireless, and vice versa, as also known in the art.

Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Accordingly, it is intended that the scope of the invention be defined by the claims appended hereto.

What is claimed is:

1. A method for producing an incremental signal from an absolute measurement signal, the method comprising:

receiving a rate of change of an absolute measurement signal; generating a variable frequency signal based upon the rate of change, wherein the frequency of the variable frequency signal is proportional to the rate of change; and providing a first incremental signal comprising a series of pulses, wherein the frequency of the pulses is based upon the frequency of the variable frequency signal and wherein a transition of the first incremental signal represents a predetermined unit of change of the absolute measurement signal.

2. The method as recited in claim 1, wherein the absolute measurement signal comprises a position signal from a position transducer.

3. The method as recited in claim 1, further comprising: generating a second incremental signal which is shifted in phase with respect to the first incremental signal.

4. The method as recited in claim 1, further comprising:
decoding the first incremental signal to determine a synthesized measurement; and
determining the difference between the synthesized measurement and absolute measurement to generate a measurement error signal.

5. The method as recited in claim 4, further comprising:
applying the measurement error signal to the rate of change signal to produce a rate of change command.

6. The method as recited in claim 5, wherein the applying step comprises:
multiplying the measurement error signal by a first gain value to produce a first product;
multiplying the rate of change signal by a second gain value to produce a second product; and
summing the first and second products to produce the rate of change command.

7. The method as recited in claim 5, wherein the variable frequency signal is generated by steps comprising:
converting the rate of change command from a digital signal to an analog voltage signal; and
producing the variable frequency signal based upon the amplitude of the analog voltage signal, such that the frequency of the variable frequency signal is proportional to the amplitude of the analog voltage signal.

8. A method for producing an incremental signal from a position measurement, the method comprising:
generating an interrogation pulse to create a mechanical wave in a waveguide;
generating a response pulse from the mechanical wave;
measuring the time between the interrogation pulse and the response pulse;
determining a position measurement based upon the measured time;
calculating a velocity from the position measurement;
converting the velocity to a variable frequency signal; and
generating a first incremental signal using the variable frequency signal, wherein the first incremental signal comprises a series of pulses, the frequency of the pulses being proportional to the variable frequency signal.

9. The method as recited in claim 8, further comprising:
generating a second incremental signal which is shifted in phase with respect to the first incremental signal.

10. The method as recited in claim 9, wherein the phase shift between the first and second incremental signals is dependent upon the sign of the velocity.

11. The method as recited in claim 9, wherein the velocity is converted to a variable frequency signal by steps comprising:
decoding the first and second incremental signals to determine a synthesized position measurement;
determining the difference between the synthesized position measurement and the position measurement to generate a position measurement error signal;
applying the position measurement error signal to the velocity to produce a velocity command; and
generating a variable frequency signal having a frequency proportional to the velocity command.

12. The method as recited in claim 11, wherein the applying step comprises:
multiplying the position measurement error signal by a first gain value to produce a first product;
multiplying the velocity by a second gain value to produce a second product; and
adding the first and second products to produce the velocity command.

13. The method as recited in claim 11, further comprising: converting the velocity command from a digital signal to an analog voltage signal.

14. A system for converting an absolute measurement signal to an incremental signal, the system comprising:
a sensor configured to provide an absolute measurement;
a calculation circuit in communication with the sensor and configured to determine the rate of change of the absolute measurement;
a variable frequency generator circuit configured to provide a variable frequency signal whose frequency varies based upon the rate of change; and
an incremental signal generator circuit in communication with the variable frequency generator circuit, wherein the incremental signal generator circuit is configured to provide a first series of pulses whose frequency is proportional to the frequency of the variable frequency signal and to provide a second series of pulses whose phase is shifted with respect to the first series of pulses, wherein a transition of the pulses represents a predetermined unit of change of the absolute measurement.

15. The system as recited in claim 14, wherein the sensor comprises a position transducer, and wherein the calculation circuit, variable frequency generator circuit, and incremental signal generator circuit are integrated with the position transducer.

16. The system as recited in claim 14, wherein the variable frequency signal generator comprises a voltage-to-frequency convertor.

17. The system as recited in claim 14, wherein the calculation circuit comprises a digital device, and wherein the system further comprises:
a digital-to-analog convertor circuit in communication with the digital device.

18. The system as recited in claim 14, wherein the incremental signal generator comprises:
a first flip flop circuit configured to provide the first series of pulses; and
a second flip flop circuit configured to provide the second series of pulses.

19. The system as recited in claim 18, further comprising:
a switching circuit configured to switch between the second series of pulses and the inverse of the second series of pulses according to the sign of the rate of change.

20. The system as recited in claim 19, further comprising:
an inverter circuit in communication with the second flip flop circuit and configured to produce the inverse of the second series of pulses.

21. The system as recited in claim 14, further comprising:
a square wave convertor circuit in communication with the variable frequency generator circuit and configured to convert the variable frequency signal to a square wave signal.

22. The system as recited in claim 14, further comprising:

a decoder circuit in communication with the incremental signal generator and configured to calculate a synthesized measurement signal from the first and second incremental signals.

23. The system as recited in claim 22, further comprising:

an error signal generator circuit in communication with the decoder and the sensor and configured to provide an error signal based on the absolute measurement and the synthesized measurement signal; and a velocity command generator circuit in communication with the calculation circuit and the error signal generator circuit and configured to produce a velocity command based upon the error signal and the rate of change.

24. A method for producing an incremental signal from an absolute measurement signal, the method comprising:

providing an absolute measurement signal;

determining the difference between the absolute measurement signal and a synthesized measurement signal;

generating a first incremental signal and a second incremental signal based upon the difference, wherein the incremental signals are out of phase and wherein a transition of the incremental signals represents an amount of change of the absolute measurement signal; and decoding the incremental signals to generate the synthesized measurement signal.

25. The method as recited in claim 24, wherein the absolute measurement signal is a transducer position signal.

26. The method as recited in claim 24, further comprising:

calculating a rate of change of the absolute measurement signal;

calculating a rate of change command based upon the rate of change and the difference; and generating a variable frequency signal based upon the rate of change command, wherein the frequency of the variable frequency signal is proportional to the rate of change command, and wherein the incremental signals are generated from the variable frequency signal.

27. The method as recited in claim 26, further comprising:

multiplying the rate of change by a first gain value to produce a first product;

multiplying the difference by a second gain value to produce a second product; and adding the first and second products to calculate the rate of change command.

* * * * *